(12) United States Patent
Teng et al.

(10) Patent No.: US 7,577,698 B2
(45) Date of Patent: Aug. 18, 2009

(54) FAST FOURIER TRANSFORM PROCESSOR

(75) Inventors: Jun-Xian Teng, Taipei (TW); Hsien-Yuan Hsu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 780 days.

(21) Appl. No.: 11/024,388

(22) Filed: Dec. 28, 2004

(65) Prior Publication Data

US 2006/0143258 A1  Jun. 29, 2006

(51) Int. Cl.
G06F 17/14  (2006.01)
(52) U.S. Cl. .................................. 708/404; 708/400
(58) Field of Classification Search .......... 708/400–409
See application file for complete search history.

(56) References Cited

U.S. PATENT DOCUMENTS

| | | | | |
|---|---|---|---|---|
| 6,247,034 | B1 * | 6/2001 | Nakai et al. ................. | 708/409 |
| 7,062,523 | B1 * | 6/2006 | Hoffman et al. ............. | 708/404 |
| 7,164,723 | B2 * | 1/2007 | Sunwoo ...................... | 708/408 |
| 7,197,095 | B1 * | 3/2007 | Van Wechel et al. ........ | 708/404 |
| 7,395,293 | B1 * | 7/2008 | Szedo et al. ................ | 708/404 |
| 2003/0236809 | A1 * | 12/2003 | Hou ........................... | 708/400 |
| 2004/0059766 | A1 * | 3/2004 | Yeh ............................ | 708/406 |
| 2004/0243656 | A1 * | 12/2004 | Sung et al. .................. | 708/404 |
| 2005/0160127 | A1 * | 7/2005 | Swartzlander et al. ...... | 708/404 |

OTHER PUBLICATIONS

PACT Corporation, "FFT-64 on the XPP Implementation Example", Feb. 12, 2002; P1~P24.
Thomas Lenart and Viktor Owall, "A Pipelined FFT Processor using Data Scaling with Reduced Memory Requirements", Aug. 18, 2002.
K. Maharatna, E. Grass and U. Jagdhold, "A Novel 64-Point FFT/IFFT Processor for IEEE 802.11(A) Standard", PII-321~PII324, 2003.
Jiun-In Guo and Chien-Chang Lin, "A New Hardware Efficient Design for the One Dimensional Discrete Fourier Transform", PV-549~PV-552, 2002.

* cited by examiner

Primary Examiner—Chat C Do (57) ABSTRACT

A Fast Fourier Transform (FFT) processor is provided. It comprises a multiplexer, a first angle rotator, a second angle rotation and multiplexing unit, an adder, a twiddle factor storage, a multiplier, and a data storage. The FFT processor analyzes the input/output order of the Fast Fourier Transformation, separates the portions requiring complex computations, simplifies the hardware thereof, and adjusts the output order. It not only effectively saves the hardware area, but also reduces the computations and memory access count. Thereby, the power consumption is reduced.

11 Claims, 13 Drawing Sheets

|      | x(0) | x(1)     | x(2) | x(3)      | x(4) | x(5)     | x(6) | x(7)     |
| ---- | ---- | -------- | ---- | --------- | ---- | -------- | ---- | -------- |
| X(0) | 1    | 1        | 1    | 1         | 1    | 1        | 1    | 1        |
| X(1) | 1    | W(1,8)   | -j   | -j W(1,8) | -1   | -W(1,8)  | j    | j W(1,8) |
| X(2) | 1    | -j       | -1   | j         | 1    | -j       | -1   | j        |
| X(3) | 1    | -j W(1,8)| j    | W(1,8)    | -1   | j W(1,8) | -j   | -W(1,8)  |
| X(4) | 1    | -1       | 1    | -1        | 1    | -1       | 1    | -1       |
| X(5) | 1    | -W(1,8)  | -j   | j W(1,8)  | -1   | W(1,8)   | j    | -j W(1,8)|
| X(6) | 1    | j        | -1   | -j        | 1    | j        | -1   | -j       |
| X(7) | 1    | j W(1,8) | j    | -W(1,8)   | -1   | -j W(1,8)| -j   | W(1,8)   |

FIG. 5

|      | x(0) | x(1)      | x(2) | x(3)       | x(4) | x(5)      | x(6) | x(7)      |
| ---- | ---- | --------- | ---- | ---------- | ---- | --------- | ---- | --------- |
| X(0) | 1    | 1         | 1    | 1          | 1    | 1         | 1    | 1         |
| X(2) | 1    | -j        | -1   | j          | 1    | -j        | -1   | j         |
| X(4) | 1    | -1        | 1    | -1         | 1    | -1        | 1    | -1        |
| X(6) | 1    | j         | -1   | -j         | 1    | j         | -1   | -j        |
| X(1) | 1    | W(1,8)    | -j   | -j W(1,8)  | -1   | -W(1,8)   | j    | j W(1,8)  |
| X(3) | 1    | -j W(1,8) | j    | W(1,8)     | -1   | j W(1,8)  | -j   | -W(1,8)   |
| X(5) | 1    | -W(1,8)   | -j   | j W(1,8)   | -1   | W(1,8)    | j    | -j W(1,8) |
| X(7) | 1    | j W(1,8)  | j    | -W(1,8)    | -1   | -j W(1,8) | -j   | W(1,8)    |

FIG. 6

|      | x(0) | x(1) | x(2) | x(3) | x(4) | x(5) | x(6) | x(7) |
|------|------|------|------|------|------|------|------|------|
| X(0) | 1    | 1    | 1    | 1    | 1    | 1    | 1    | 1    |
| X(2) | 1    | -j   | -1   | j    | 1    | -j   | -1   | j    |
| X(4) | 1    | -1   | 1    | -1   | 1    | -1   | 1    | -1   |
| X(6) | 1    | j    | -1   | -j   | 1    | j    | -1   | -j   |
| X(1) | 1    | -j   | -j   | 1    | -1   | j    | j    | -1   |
| X(3) | 1    | -1   | -j   | -j   | -1   | 1    | j    | j    |
| X(5) | 1    | -1   | j    | -j   | -1   | 1    | -j   | j    |
| X(7) | 1    | j    | -j   | -1   | -1   | -j   | j    | 1    |

| 0 | 0 | 0 | 0 | 0 | 0 | 0 | 0 |
|---|---|---|---|---|---|---|---|
| 0 | 1 | 2 | 3 | 4 | 5 | 6 | 7 |
| 0 | 2 | 4 | 6 | 8 | 10 | 12 | 14 |
| 0 | 3 | 6 | 9 | 12 | 15 | 18 | 21 |
| 0 | 4 | 8 | 12 | 16 | 20 | 24 | 28 |
| 0 | 5 | 10 | 15 | 20 | 25 | 30 | 35 |
| 0 | 6 | 12 | 18 | 24 | 30 | 36 | 42 |
| 0 | 7 | 14 | 21 | 28 | 35 | 42 | 49 |

|  | memory size | twiddle factor read only memory | multiplier | adder | rotator | efficient computation | control mechanism |
|---|---|---|---|---|---|---|---|
| R2MDC | 94 | 32 | 6 | 16 | 0 | N/A | simple |
| R2MDC | 63 | 32 | 6 | 16 | 0 | N/A | simple |
| R4SDF | 63 | 29 | 3 | 32 | 0 | N/A | middle |
| R4MDC | 12 | 29 | 9 | 12 | 0 | N/A | complicate |
| R2² SDF | 63 | 32 | 3 | 16 | 0 | N/A | simple |
| R2⁴ SDF | 63 | 29 | 2 | 12 | 0 | N/A | simple |
| Gold & Bially | 208 | 29 | 6 | 24 | 0 | N/A | N/A |
| He & Torkelson | 64 | 60 | 11 | 48 | 0 | add 50% mul 75% | N/A |
| Swartzlander et al | 160 | 60 | 6 | 24 | 0 | add 100% mul 100% | N/A |
| R8 | 64 | 25 | 1 | 7 | 2 | add 100% mul 100% ratator 25% | simple |
| Mahartna | 181 | 25 | 14 | 14 | 4 | add ~100% mul 100% ratator ~50% | simple |
| Jia | 135 | 25 | 1 | 7 | 3 | add 75% mul ~33% | middle |
| present invention | 140 | 25 | 1 | 7 | 1 | add 100% mul 100% ratator 50% | simple |

FIG. 11

FAST FOURIER TRANSFORM PROCESSOR

FIELD OF THE INVENTION

The present invention generally relates to Fast Fourier transform (FFT), and more specifically to a Fast Fourier Transform processor.

BACKGROUND OF THE INVENTION

As the mobile communication becomes more ubiquitous, the bandwidth demands of wireless local area network (WLAN) also increase. In the IEEE802.11a specification, proposed to meet the demands, the Fast Fourier Transform (FFT) computation unit plays an import ant role for modulation. The FFT computation unit is able to transform the data in the time domain into corresponding data in the frequency domain. This feature allows improvement of the signal attenuation and multi-path interference problems often faced in the wireless communication. Therefore, the present and future communication specifications will continue to utilize FFT computation. However, the wireless communication hardware must be able to support the large amount of computation.

The structures of conventional FFT circuitry are categorized into three types: single-memory, dual-memory, and pipeline. The single-memory structure uses only one computation unit and utilizes the in-place computation feature of the FFT; therefore, it uses the smallest circuitry area. However, this type of structure has the disadvantage of high computational latency. The dual-memory structure uses a memory to store input and the other to store output; therefore, it provides a higher throughput than the single-memory structure. Nevertheless, it takes $Log_r N$ computation units (r, N are positive integers), and requires the largest circuitry area.

Discrete Fourier Transform (DFT) is defined as follows:

$$X[k] = \sum_{n=0}^{N-1} x[n] w_N^{kn}$$

Where $k=0,1,\ldots,N-1$, $n=0,1,\ldots,N-1$, and $W_N = e^{-j2\pi/N}$ is a twiddle factor.

Figure 1:
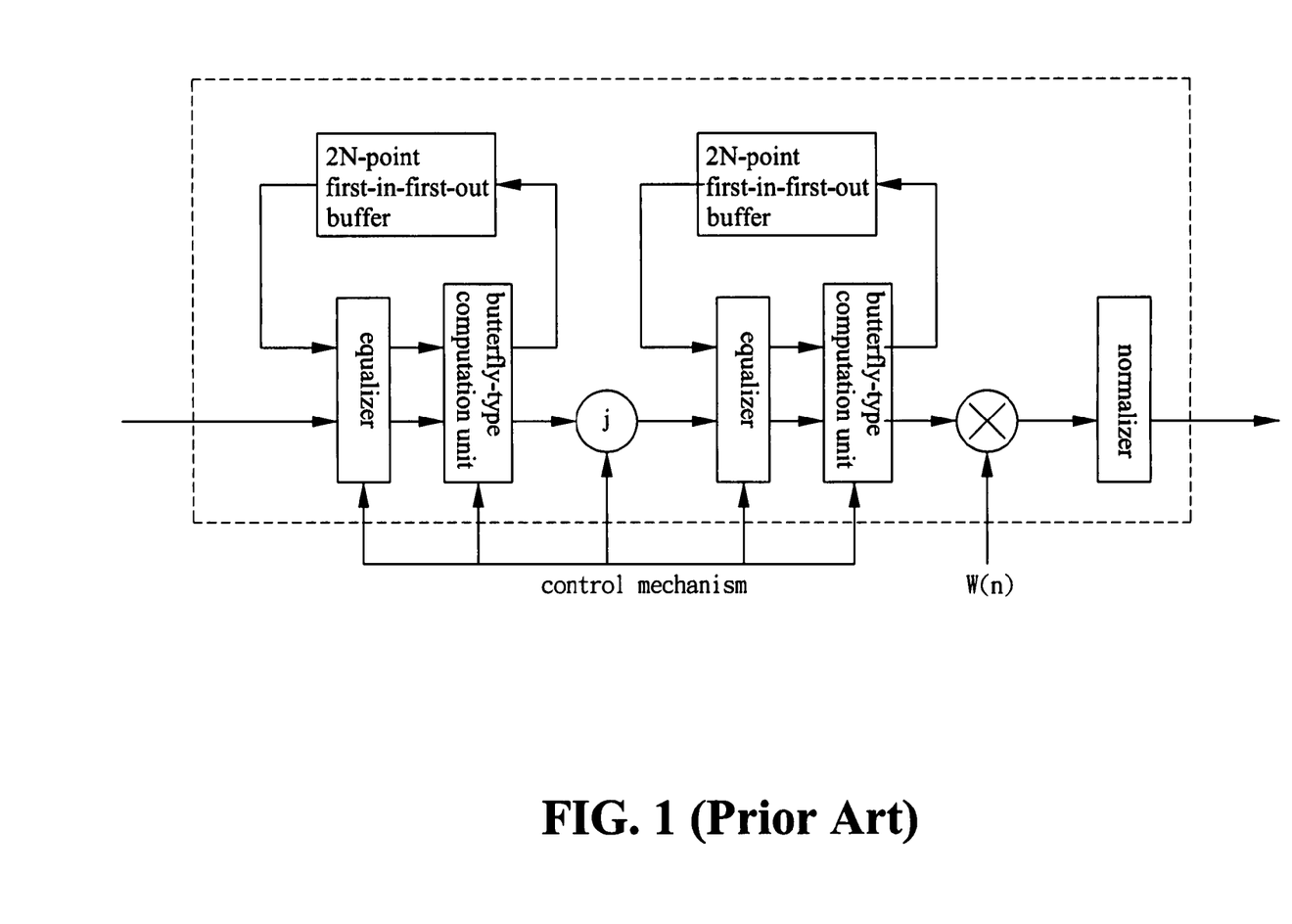
FIG. 1 shows a schematic view of the structure of a conventional FFT processor.

FIG. 1 shows a schematic view of a conventional FFT processor structure. In 2002, Lenart proposed, in "A Pipelined FFT Processor Using Data Scaling with Reduced Memory Requirements" (Proc. Of Norchip, Nov. 11-12, 2002, Copenhagen, Denmark), a pipeline structure using a base of four for FFT processor. The proposed structure takes three stages to process 64 points, and requires three multipliers and accesses the rotation factors three times. There are up to six first-in-first-out (FIFO) buffers to access in each clock.

Figure 2:
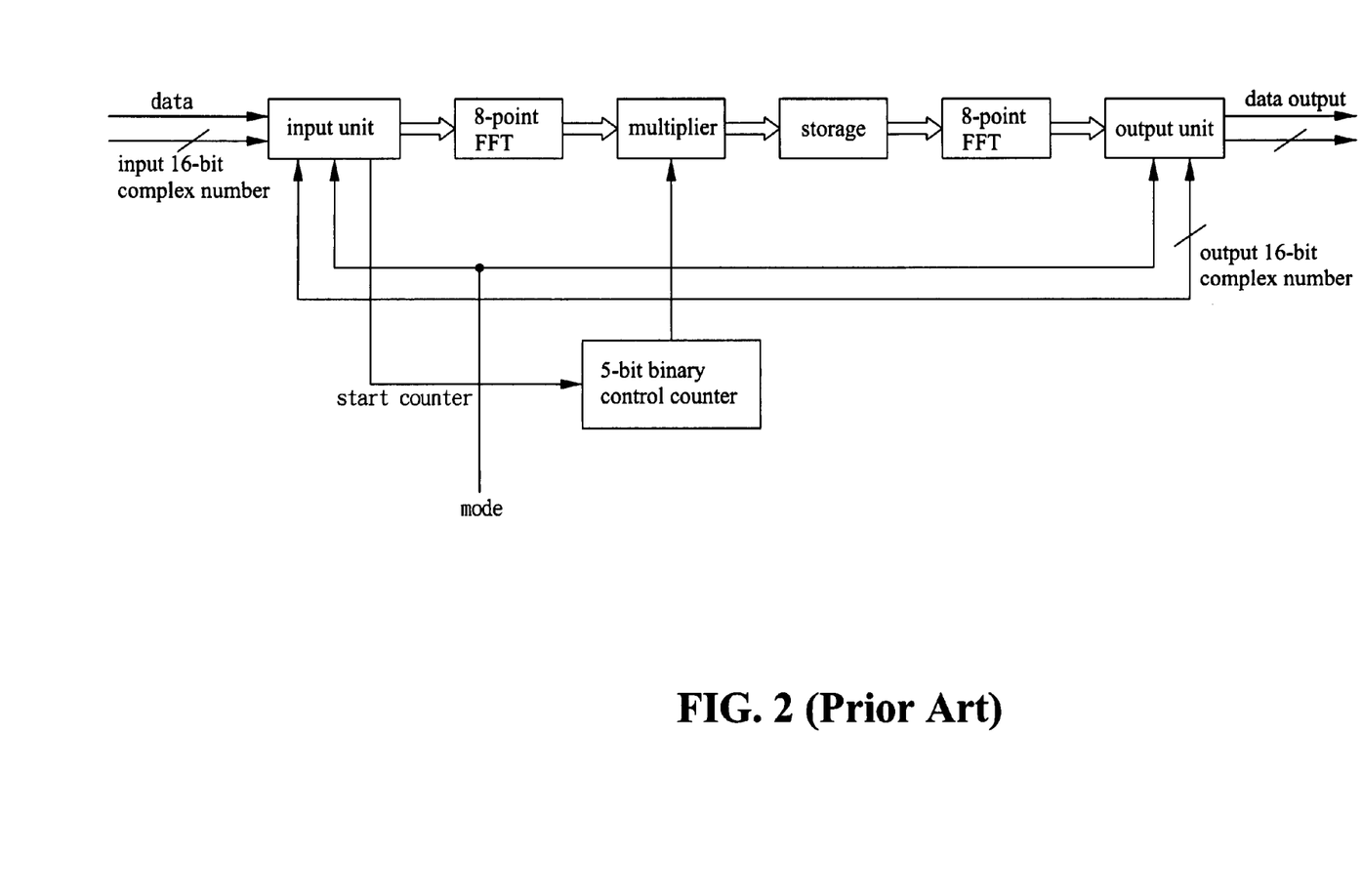
FIG. 2 shows a schematic view of the structure of another conventional FFT processor.

FIG. 2 shows a schematic view of another conventional FFT processor structure. In 2003, Maharatna proposed, in "A Novel 64-Point FFT/IFFT Processor for IEEE802.11a Standard" (ICASSP 2003), FFT processor structure using a base of 8. As shown in FIG. 2, the structure processes the 64-point FFT computation by expanding two 8-based butterfly computation units and eight output units with specialized hardware connection. Although this structure reduced the latency, it requires more hardware computation units.

Figure 3:
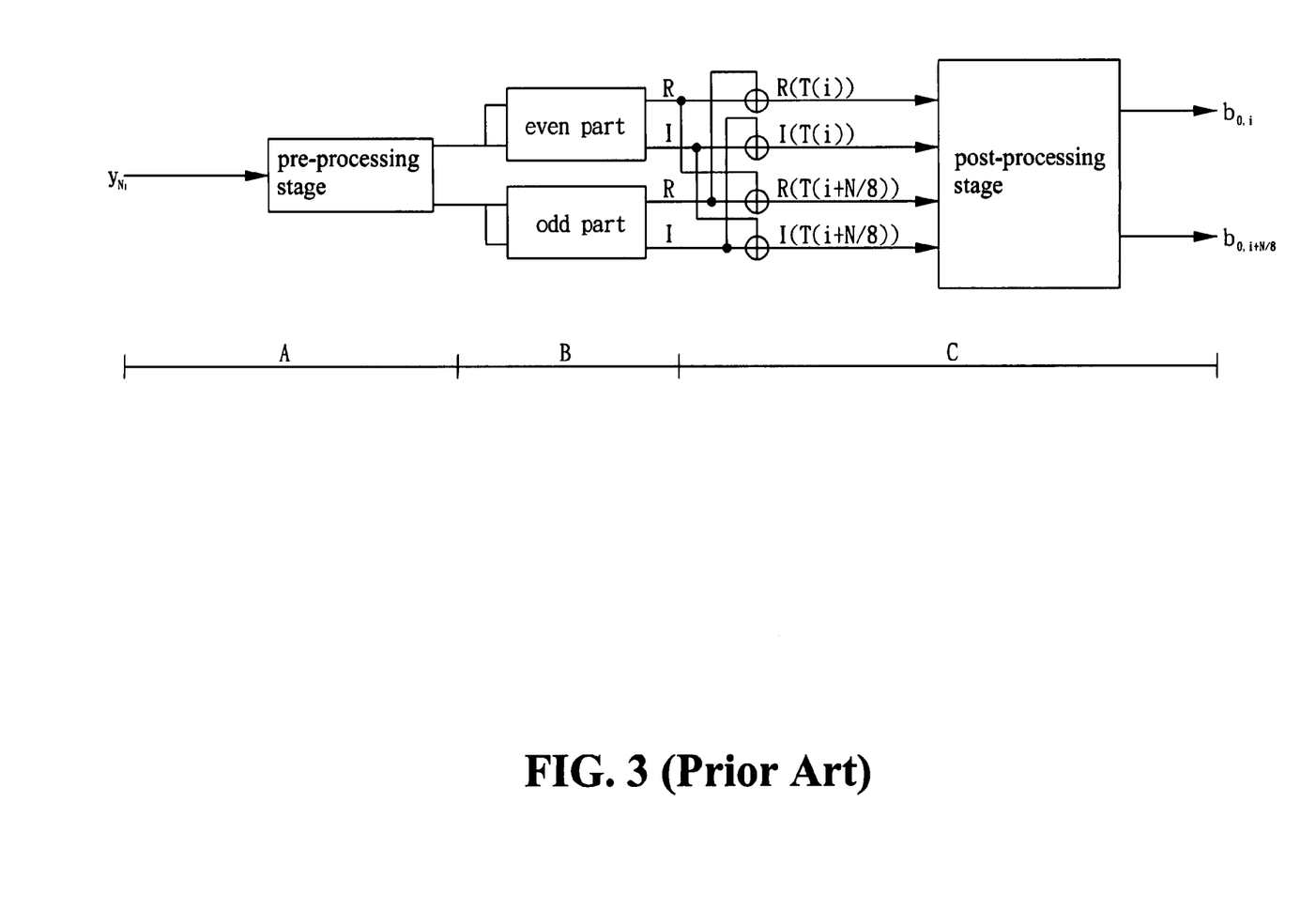
FIG. 3 shows a schematic view of the structure of yet another conventional FFT processor.

FIG. 3 shows a schematic view of yet another conventional FFT processor structure. In 2002, Guo proposed, in "A New Hardware-Efficient Design Approach for the 1D Discrete Fourier Transform" (Pattern Recognition and Image Analysis, Vol. 12, No. 3, 2002, pp. 299-307), a one-dimensional structure for a DFT processor. As shown in FIG. 3, the structure separates the computation of odd part and the even part, and requires a larger hardware circuitry area.

There are numerous structures for conventional FFT processors. The objects of an FFT processor are to use the least hardware area and cost, have the least time delay, and consume least energy. The aforementioned structures have the disadvantages of frequent accesses to memory, large amount of multiplication computations, and requiring a large number of computational units.

SUMMARY OF THE INVENTION

The present invention has been made to overcome the aforementioned drawback of conventional FFT processors. The primary object of the present invention is to provide an FFT processor, comprising a computing unit (the computing unit further comprising a multiplexer, a first angle rotator, a second angle rotation and multiplexing unit, and an adder), a twiddle factor storage, a multiplier, and a data storage. The processor reduces the hardware circuitry area, cost, as well as the technical complexity.

According to the present invention, the multiplexer is to select an input set of R data items from a plurality of R-item sets, and outputs a set of R data items. R is an M-th power of 2, and M is an integer greater than or equal to 3. The first angle rotator receives the R/2 data items from the R-item set, rotates the received R/2 data items for a first angle, and outputs the R/2 rotated data items sequentially. The second angle rotation and multiplexing unit receives a set of R data items and R/2 rotated data items. The second angle rotation and multiplexing unit must either select the R data items within a first preset duration or select R/2 data items from the R data items to combine with the rotated R/2 data items within the second preset duration, and rotates them for a second angle. Finally, the second angle rotation and multiplexing unit outputs the rotated R data items sequentially.

The adder adds the R rotated data items sequentially, and outputs a sum in frequency domain of the R rotated data items. The twiddle factor storage stores all the twiddle factors of an N-point FFT. The multiplier multiplies the sum in frequency domain with the corresponding twiddle factor sequentially, and outputs a data. The storage receives and stores the data sequentially, and outputs R data items to the multiplexer for the next stage computation if necessary.

The FFT processor of the present invention further includes a first register array and a second register array. The first register array is located between the multiplexer and the second angle rotation and multiplexing unit. The second register array is located between the first angle rotator and the second angle rotation and multiplexing unit.

The present invention is to analyze the input/output order of the computations in the FFT, extract the part that requires complex computation for simplifying hardware, and adjust the output order. This not only reduces the hardware circuitry area, cost, and technical complexity, but also reduces the computation, memory accesses and energy consumption.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 4:
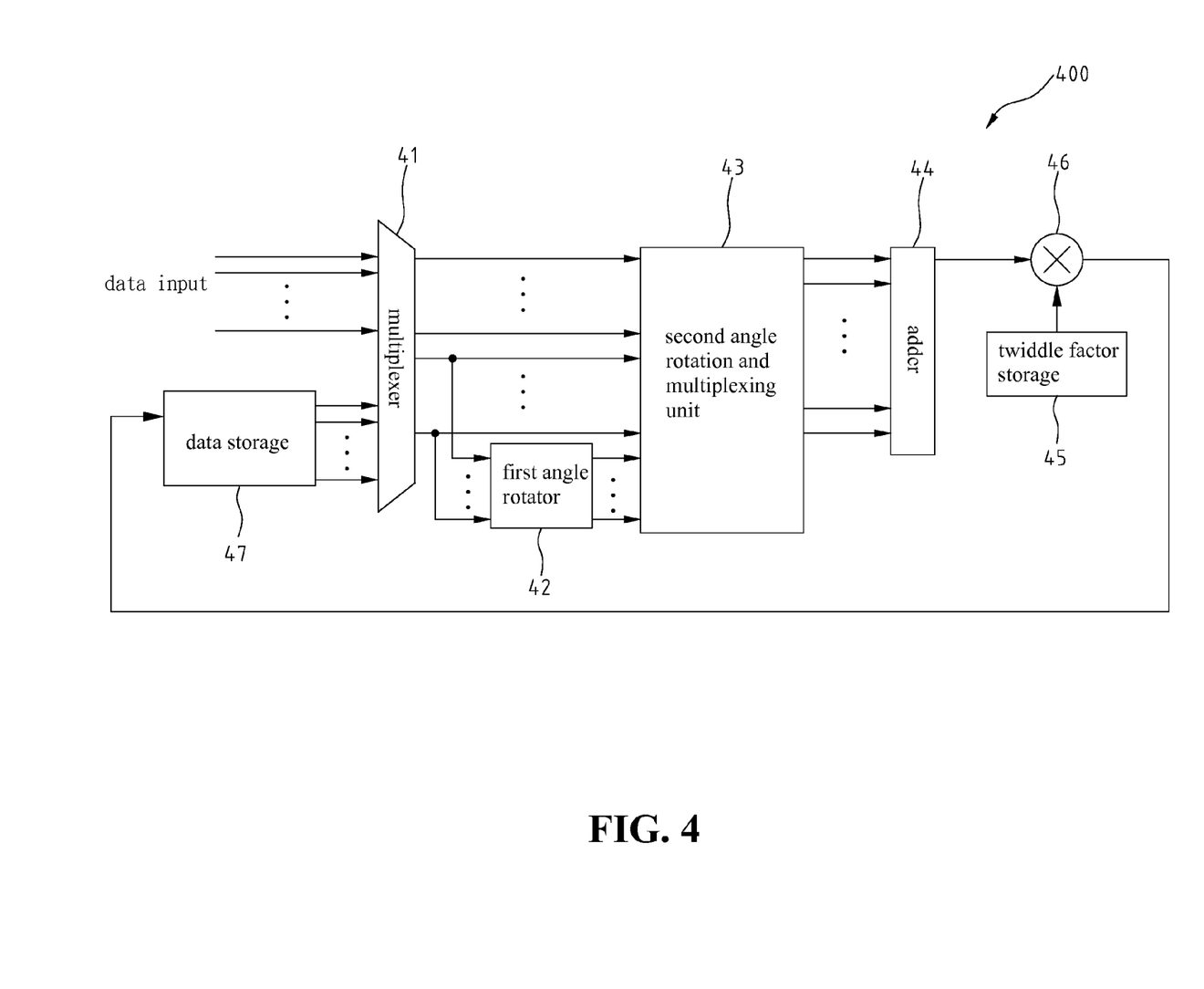
FIG. 4 shows a schematic view of the structure of a FFT processor according to the invention.

Without the loss of generality, the FFT processor is provided herein below for an example. FIG. 4 shows a schematic view of the structure of a FFT processor of the present invention. Referring to FIG. 4, FFT processor 400 comprises a computing unit (the computing unit further comprising a multiplexer 41, a first angle rotator 42, a second angle rotation and multiplexing unit 43, and an adder 44), a twiddle factor storage 45, a multiplier 46 and a storage 47. Multiplexer 41 selects an input set of R data items from a plurality of R-item sets, and outputs a set of R data items. R is an M-th power of 2, and M is an integer greater than or equal to 3. Computing unit of radix-R butterfly computation with respect to input data generates output data. First angle rotator 42 receives R/2 data items from the R-item set, rotates the received R/2 data items for a first angle, and outputs the R/2 rotated data items sequentially. Second angle rotation and multiplexing unit 43 receives a set of R data items and the R/2 rotated data items. Second angle rotation and multiplexing unit 43 must either select the R data items within a first preset duration or select R/2 data items from the R data items to combine with the rotated R/2 data items within the second preset duration, and rotates them for a second angle. Finally, second angle rotation and multiplexing unit 43 outputs the rotated R data items sequentially.

Adder 44 adds the R rotated data items sequentially, and outputs a sum in frequency domain of the R rotated data items. Twiddle factor storage 45 stores all the twiddle factors of an N-point FFT. Multiplier 46 multiplies the sum in frequency domain of the rotated data with the corresponding twiddle factor sequentially, and outputs a data. Storage 47 receives and stores the data sequentially, and outputs R data items to multiplexer 41 for the next stage computation if necessary.

Figure 5:
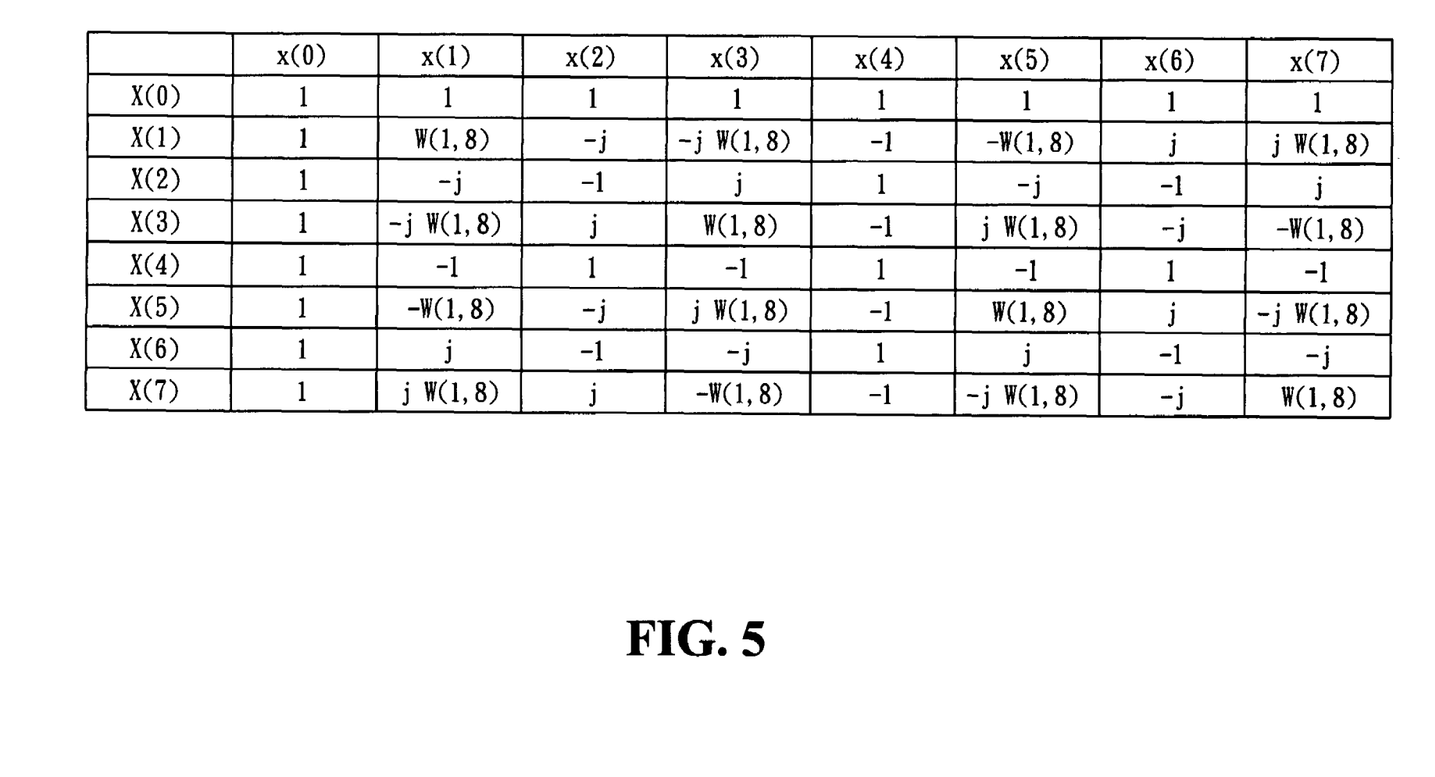
FIG. 5 shows a table of the relation between the input and the output of the DFT.
Figure 6:
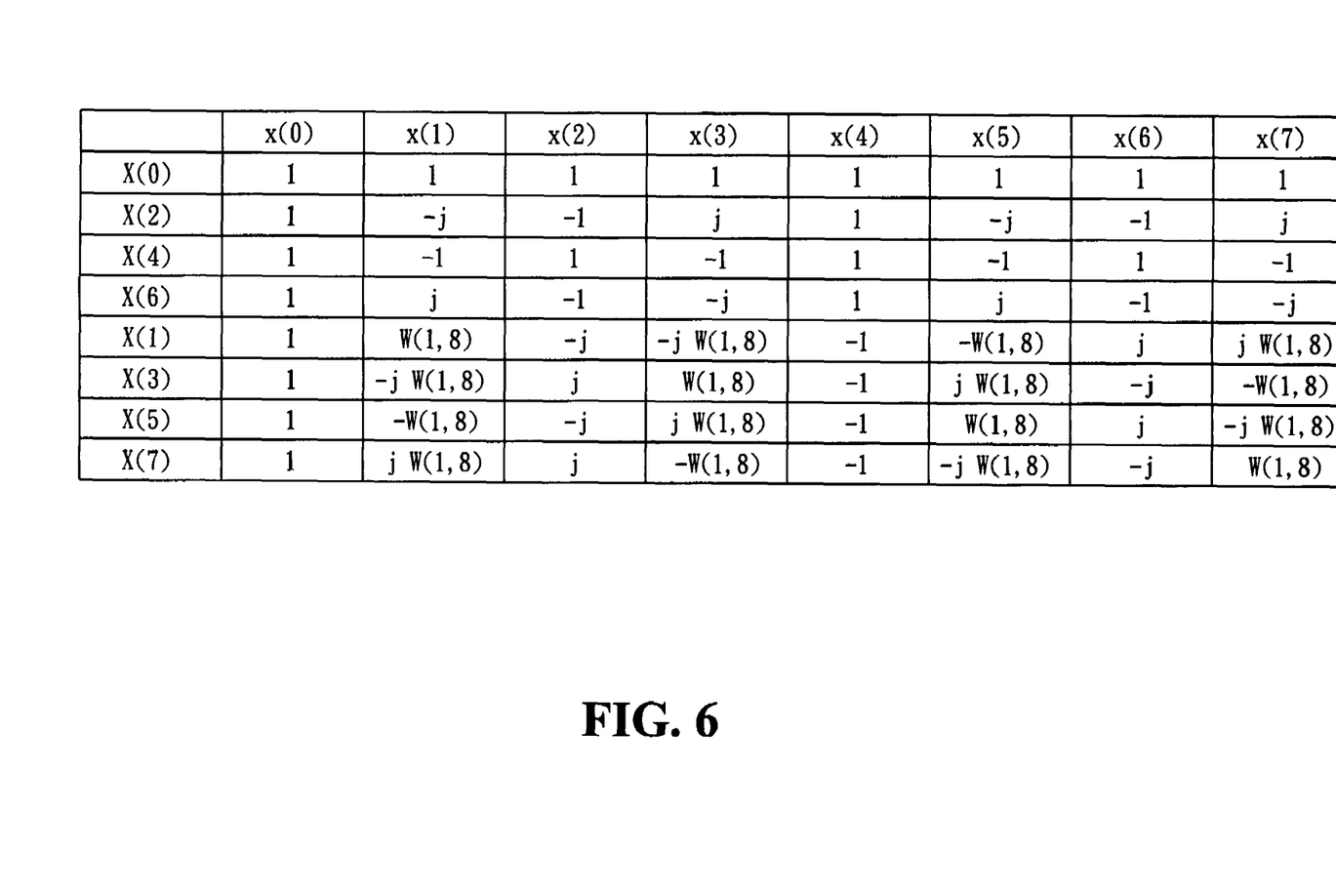
FIG. 6 shows the re-arranged computation order of the DFT.

Without the loss of generality, the following description uses R=8 to explain the structure and the operation of the present invention FIG. 5 shows a table of the relation between the input and the output of the Discrete Fourier Transform (DFT), where X(k), k=0,1 . . . 7, is the summation of its associated row elements; and FIG. 6 shows the re-arranged computation order of the DFT. As shown in FIG. 5, the corresponding input will require the complex multiplication $W(1,8)=e^{-j2\pi/8}$ only when the sequence order is 1, 3, 5 and 7. Therefore, by re-arranging the sequence order as shown in FIG. 6, the original outputs for sequence order 1, 3, 5, and 7 which require rotation become the outputs for sequence order 4, 5, 6, and 7. By postponing the output of the four data items, the multiplication computation of the complex number W(1,8) of the four data items can be performed and the results can be stored in the registers at the same time when the first four data items are being outputted. When computing the fifth output, the stored data items in the register can be used as input because the multiplication has been completed.

Figure 7:
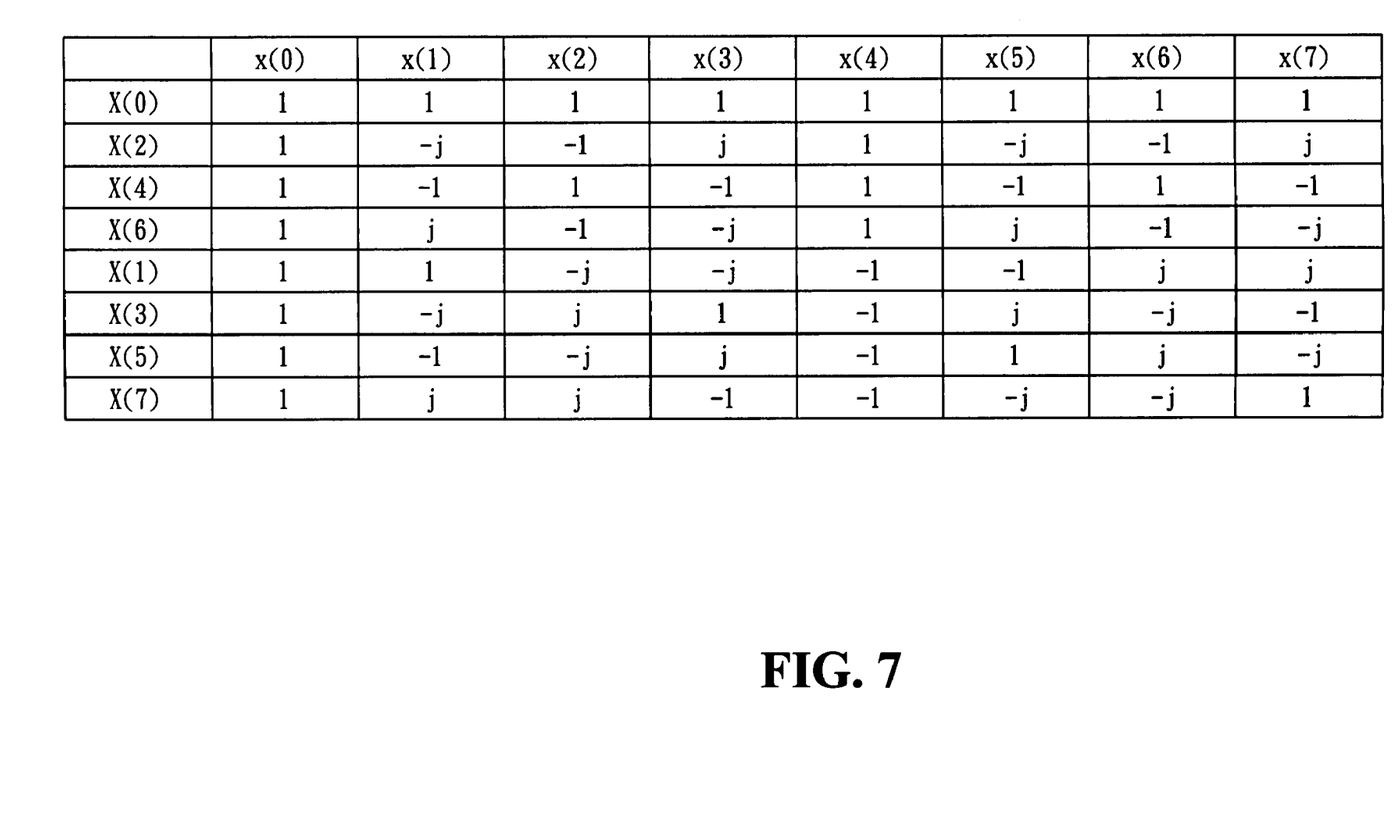
FIG. 7 shows a table of the relation between the input and the output of the DFT after extracting W(1,8) and re-arranging the order.

FIG. 7 shows the relation between the input and the output of the DFT after extracting W(1,8) and re-arranging the order. The table shown in FIG. 7 can be obtained by separating the W(1,8) complex multiplication with a butterfly-type FFT processor having a base of 8. The remaining computation can be completed with a butterfly-type FFT processor having a base of 4. The present invention does not use the algorithm with root value $2^2$ to realize the butterfly-FFT because the memory arrange is not compatible and the butterfly-FFT having a base 4 can reduce the computation delay with a carry save adder (CSA) structure.

Therefore, the actual computation can be divided into two categories. The first category includes the four outputs (X(1), X(3),X(5),X(7)) which must past the W(1,8)=2π/8 angle rotator and a butterfly-type FFT processor having a base 4. The second category includes the four outputs (X(0),X(2),X (4),X(6)) which only requires passing a butterfly-type FFT processor having a base 4 without passing an angle rotator. By re-arrangement of the time sequence, the time for computing the FFT for the second category can be used to compute the rotation W(1,8) for the first category. In this way, the efficiency of the computation units, such as for twiddle factor multiplication and the adder for butterfly-type FFT having a base of 8, is improved.

Figure 8A:
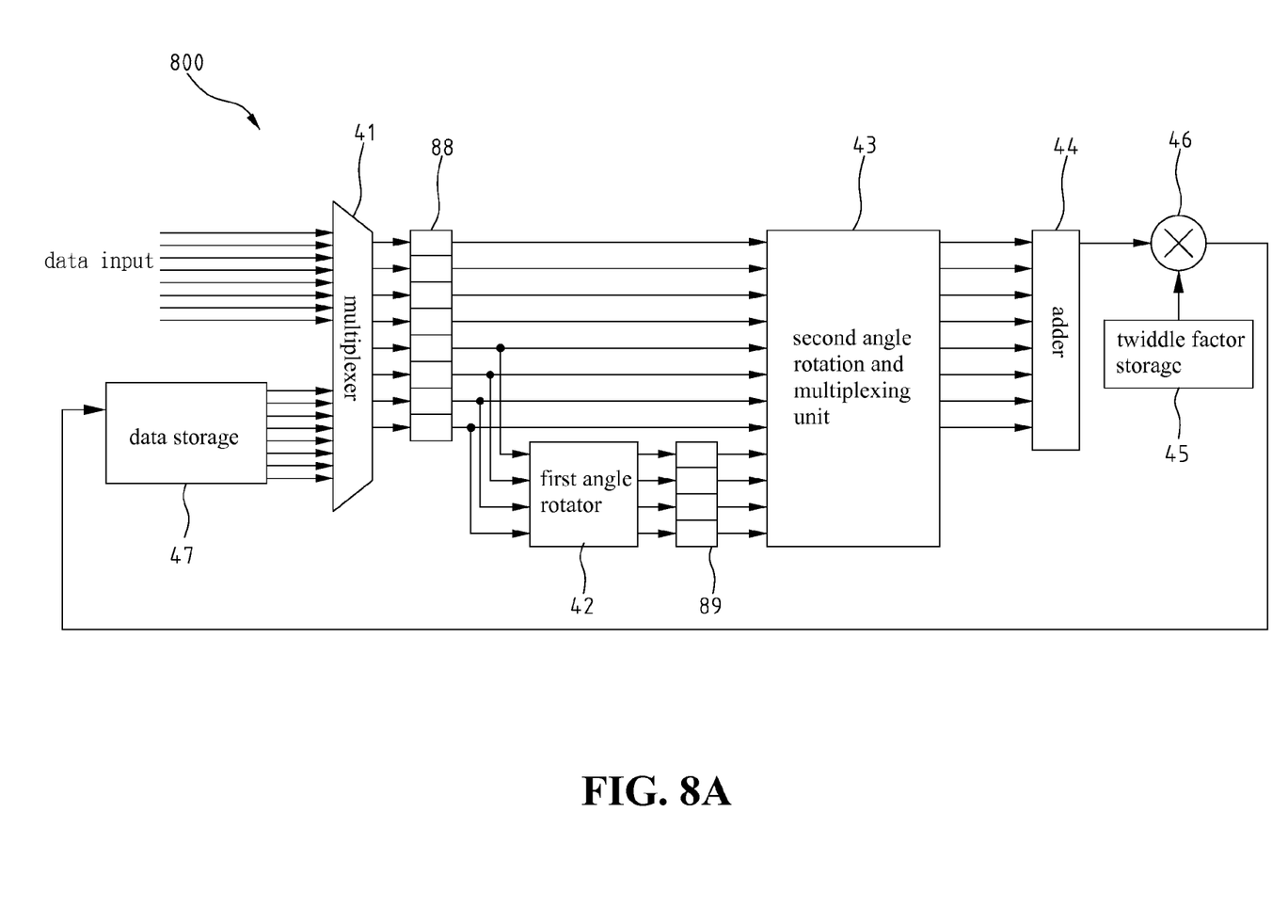
FIG. 8A shows the addition of a register array in FIG. 4 for temporary storage of input and output.

FIG. 8A adds register arrays to the structure shown in FIG. 4 for providing the storage of input and the output. As shown in FIG. 8A, an FFT processor 800 uses a storage 47, a first register array 88, and a second register array 89 to provide the bandwidth required by the input and the storage required by the output. First angle rotator 42 is realized with a shifter and an adder (will be discussed in FIG. 10). By utilizing the concept of time-sharing, the hardware circuitry is reduced by two-third. Second angle rotator 43 is realized with the crossline and part of an inverter. The compensation items required in the 2-based complimentary computation are left to adder 44 for finishing the computation. This will greatly reduce the power consumption caused by the carry item.

Figure 8B:
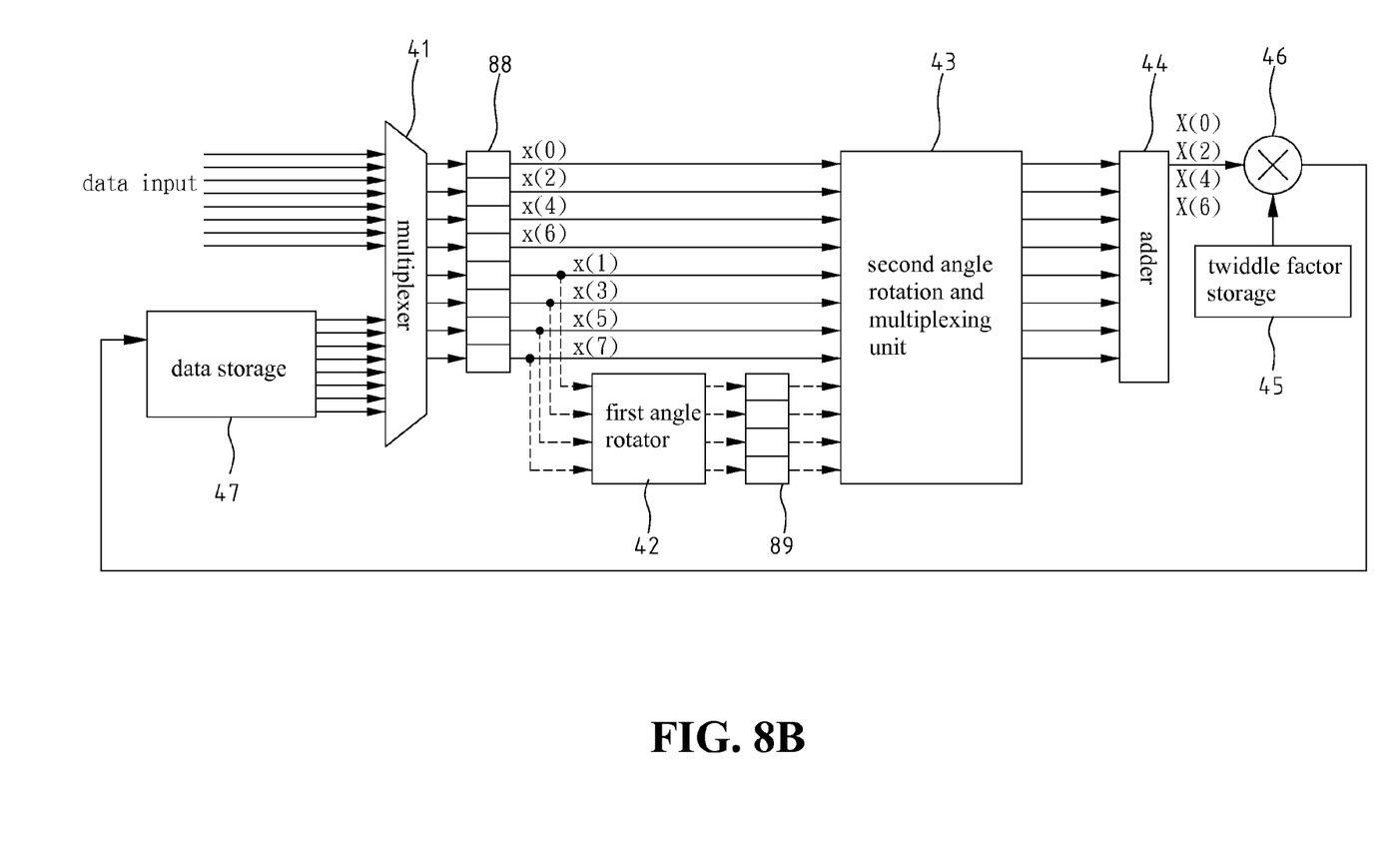
FIG. 8B shows the storing and the sequence arrangement of the data flow within the first preset duration according to the present invention.
Figure 8C:
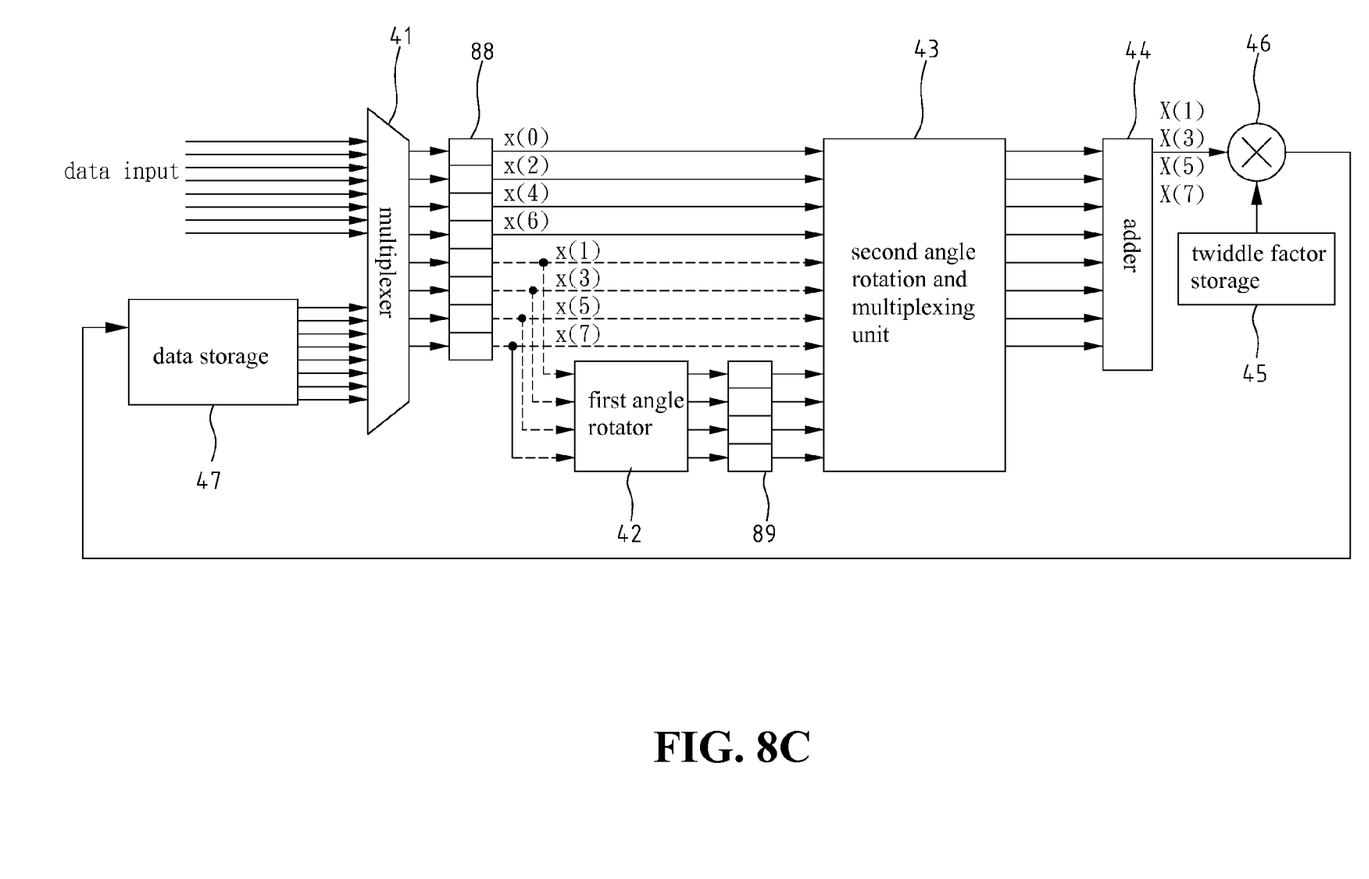
FIG. 8C shows the storing and the sequence arrangement of the data flow within the second preset duration according to the present invention.

FIG. 8B and FIG. 8C show the storing and the sequence arrangement of the data flow within the first and the second preset durations according to the present invention, respectively.

FIG. 8B shows the storing and the sequence arrangement of the data flow within the first preset duration according to the present invention. Multiplexer 41 selects a set from two 8-item sets for input, and outputs an 8-item set. As shown in FIG. 8B, second rotating and multiplexing unit 43 receives an 8-item set from first register array 88 (shown as solid line)

within the first preset duration. When second rotating and multiplexing unit 43 and adder 44 are computing frequency domain data X(0), X(2), X(4), and X(6), first angle rotator 42 receives (shown as dash line) the other four items x(1), x(3), x(5), and x(7) for rotating $2\pi/8$, and then stores the $2\pi/8$-rotated items into second register array 89.

FIG. 8C shows the storing and the sequence arrangement of the data flow within the second preset duration according to the present invention. As shown in FIG. 8C, second rotating and multiplexing unit 43 selects the remaining four items x(0), x(2), x(4), and x(6)) to combine with the four rotated items (shown as solid line) to form the input within the second preset duration. The rotation of $2\pi/4$ is performed on the input 8 items, and the results are outputted in a sequential order. Adder 44 sequentially adds the 8 rotated items and outputs the frequency domain data X(1), X(3), X(5), and X(7).

Take R=8 as an example. The present invention uses an FFT having a base of 8. As pointed out by Yeo (Low Power Implementation of FFT/IFFT Processor for IEEE 802.11a Wireless LAN Transceiver), the design using the base 8 consumes the least amount of power. In applications, IEEE 802.11a specification demands a 64-point FFT structure. Therefore, the present invention uses two cycles of computation to implement the 64-point FFT, that is, two stages of computation. This not only saves the computation, but also saves the memory access (twiddle factor storage 45 and storage 47); therefore, the power consumption is reduced.

Figure 9:
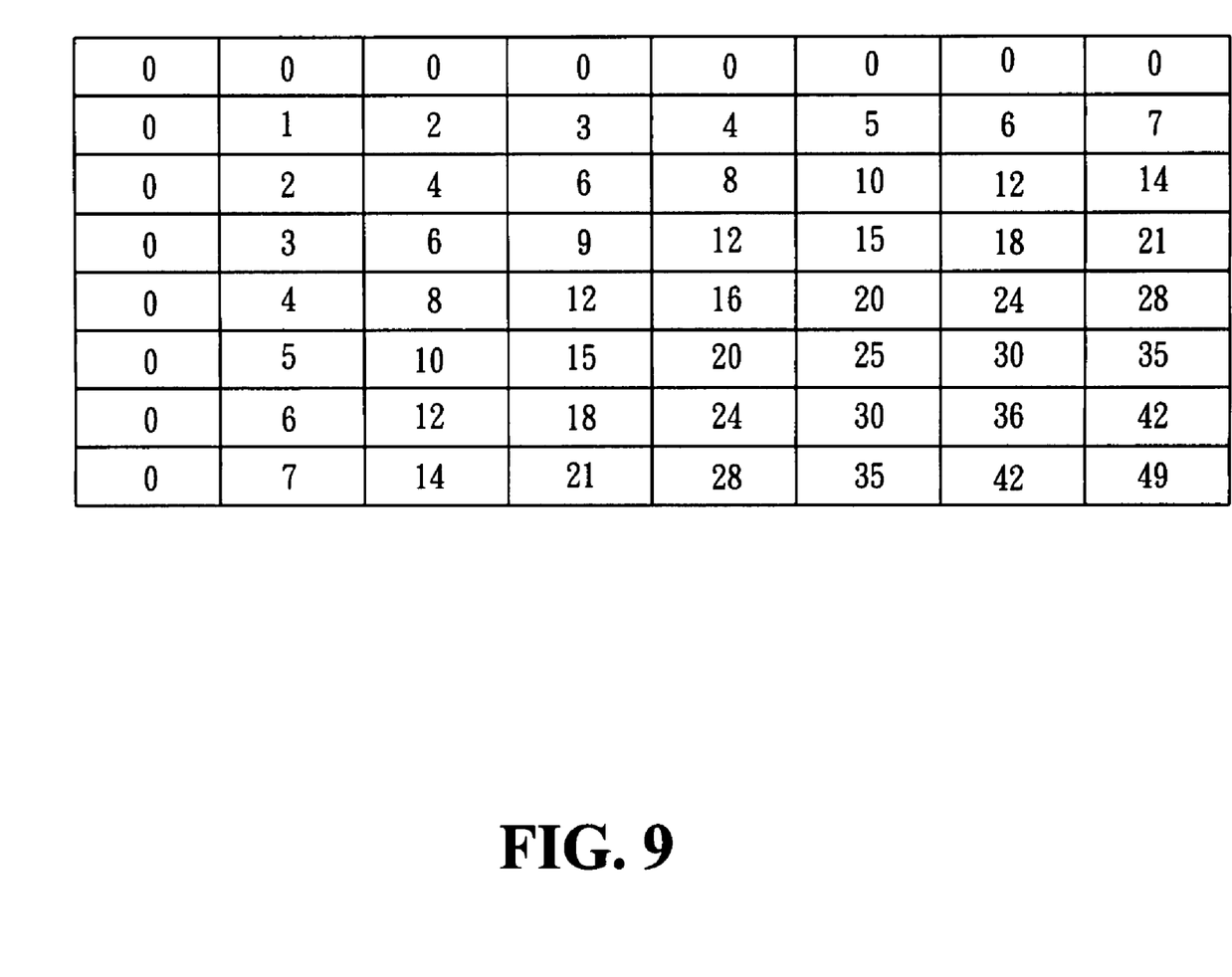
FIG. 9 shows a table of the twiddle factors in a 64-point FFT.

The output of adder 44 is the end of the first stage. To implement the 64-point FFT, the corresponding twiddle factors must be read from twiddle factor storage 45. FIG. 9 shows a table(a look-up table) for the twiddle factors for 64-point FFT; where the ordering number (0 to 63) is ascending from the left to the right of the highest row, and then repeats at the following lower rows. The frequency domain data X(0)-X(8) are required to be multiplied by the twiddle factor W(0,64)= $e^{-(j2\pi/64))*0}=1$, and X(9) must be multiplied by the twiddle factor W(1,64)= $e^{-(j2\pi/64)*1}$, X(63) must be multiplied by the twiddle factor W(49,64)= $e^{-(j2\pi/64)*49}$, and so on.

In the 64-point FFT, the first batch of frequency domain data X(0), X(8), X(16), X(24), X(32), X(40), X(48), and X(56) outputted by adder 44 of the first stage are multiplied by the corresponding twiddle factors in the multipliers, and stored in storage 47. After the entire 64 points finish the first stage computation, the second stage computation will start.

In general, one of the major difficulties in implementing an 8-based FFT circuitry is the rotation of the $2\pi/8$ angle. This rotation requires two real-number multipliers and a real-number adder. The rotation can be expressed with the twiddle factor in the FFT and become the complex-number multiplication $$W(1, 8) = e^{-(j\frac{2\pi}{8})}.$$

However, in the structure of the present invention, the simplification of the W(1,8) becomes:

$$a \times e^{-(j\frac{2\pi}{8})} = $$
$$a \times \left(\frac{\sqrt{2}}{2}\right) \times (1+j) \cong a \times (2^{-1} + 2^{-3} + 2^{-4} + 2^{-6} + 2^{-8} + 2^{-9}) \times (1+j)$$

which can be further re-arranged as:

$$a \times e^{-(j\frac{2\pi}{8})} \cong a \times (2^{-1} + 2^{-3} + 2^{-4} + 2^{-6} + 2^{-8} + 2^{-9}) = $$
$$(a \times (2^{-1} + 2^{-3} + 2^{-4})) \times (1 + 2^{-5}) \times (1+j)$$

By doing this, the complex-number multiplication is simplified as computation that can be performed by a shift adder; thus, this improves the hardware circuitry area and the computation delay.

Figure 10:
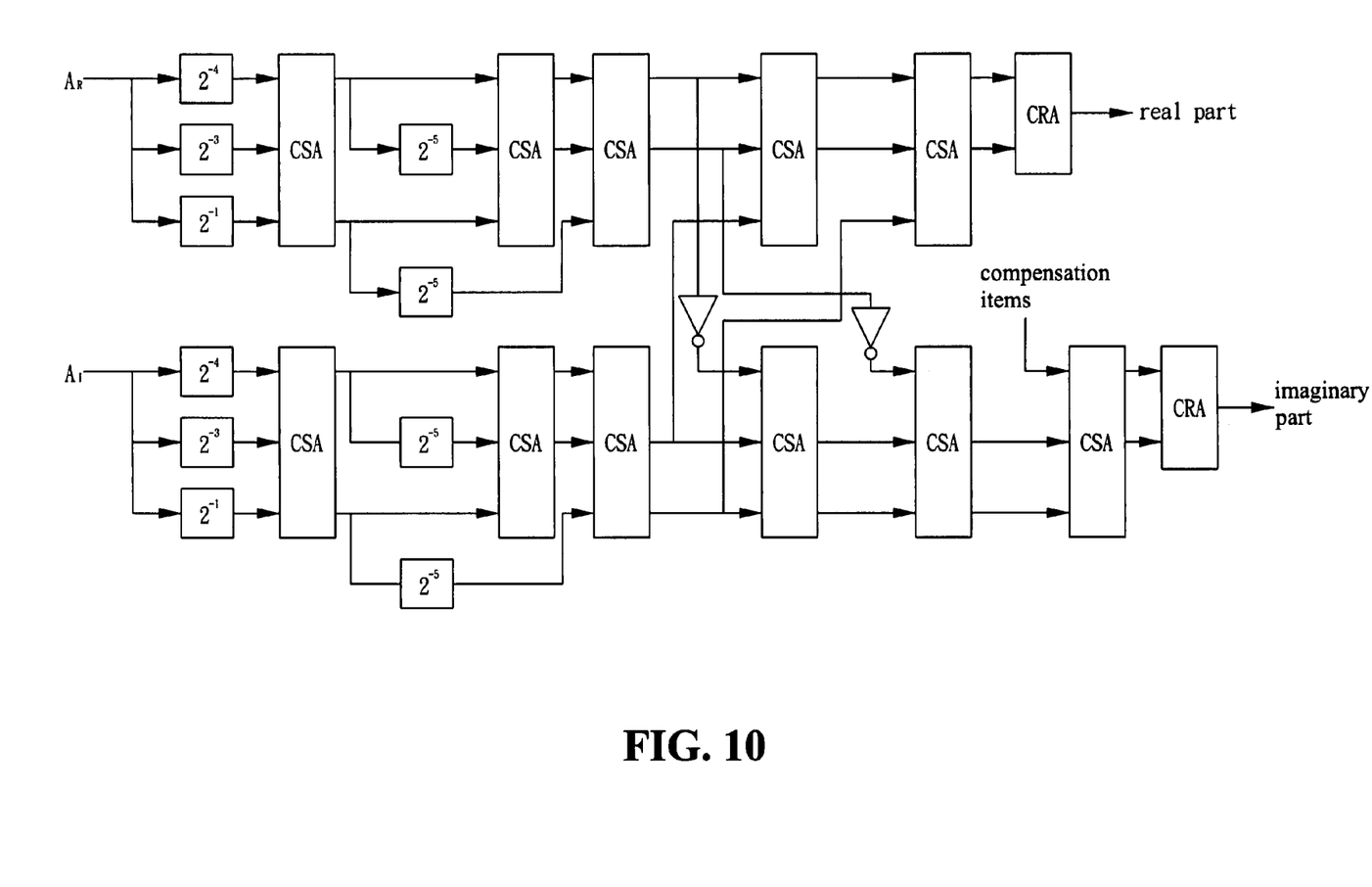
FIG. 10 shows a hardware structure of the first angle rotator of the present invention using R=8 as an embodiment.

FIG. 10 is the hardware structure of the first angle rotator of the present invention, with R=8 as an example. As shown in FIG. 10, the first angle rotator of the present invention implements the last stage of summation with the carry save adder (CSA) structure so as to avoid the delay and the power consumption caused by the carry operation. Because the delay caused by the carry ripple adder (CRA) is proportional to the number of bits of the input, and the delay of each stage in the CSA is a fixed amount of time, the structure can accomplish the computation faster.

Figure 11:
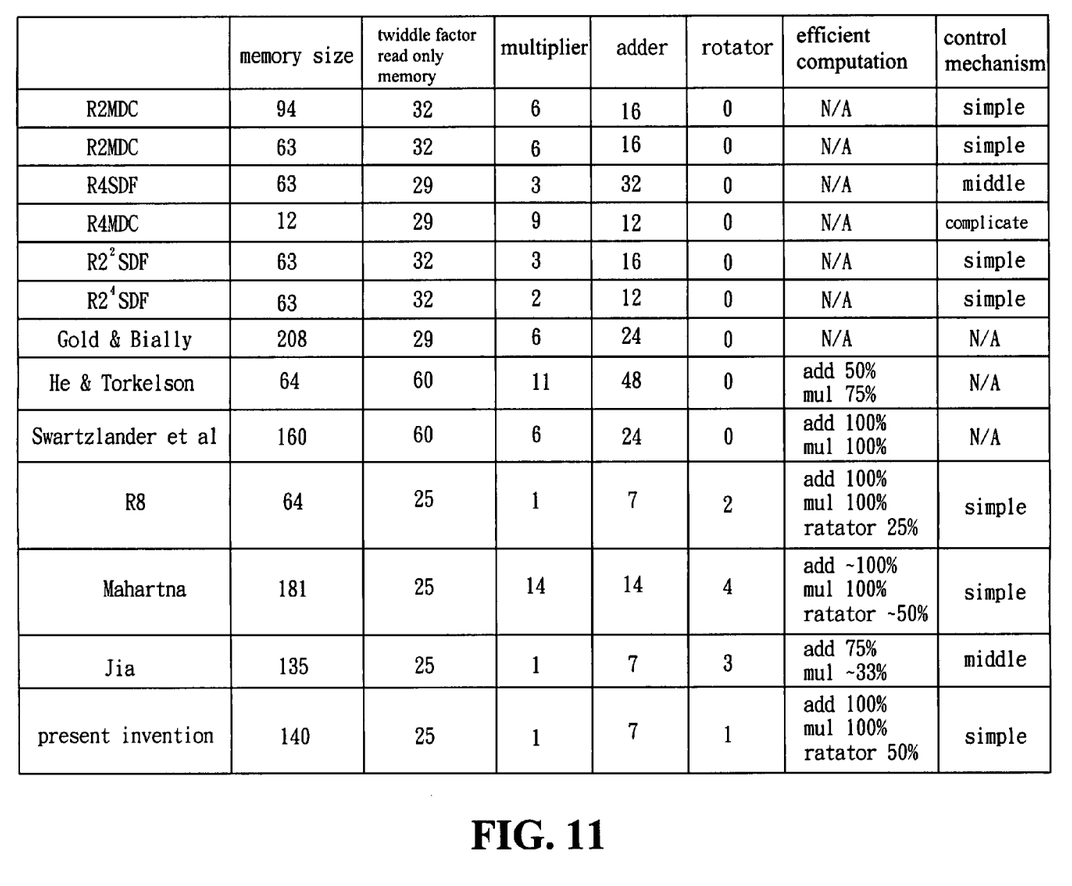
FIG. 11 shows the functional comparison between the FFT processor of the present invention and conventional FFT processors.

FIG. 11 shows the hardware structure and functionality comparison between the FFT processor of the present invention and conventional techniques. As shown in the table, the FFT processor of the present invention has the advantages of simple control mechanism, efficient computation, requiring less computation units and requiring less memory.

In summary, the FFT processor of the present invention uses the temporary register storage for the intermediate computation results and re-arranges the sequence order of each operand so that the required operands can be pre-loaded into the registers. Therefore, the higher bandwidth of the registers can be achieved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A Fast Fourier Transform computing device for transforming time domain input digital data to frequency domain output digital data, said computing device comprising:
    a computing unit selecting R data items for performing radix-R butterfly computation with respect to said R data items to generate R rotated data items and output a sum in frequency domain of said R rotated data items, said R data items being selected from said input digital data and a set of transition-stage data;
    a first storage device for storing twiddle factors of an N-point FFT;
    a multiplier for sequentially multiplying said sum in frequency domain from said computing unit with a corresponding twiddle factor from said first storage device, and outputting a transition-stage data item; and
    a second storage device for receiving and storing said transition-stage data item sequentially, and outputting another set transition-stage data to said computing unit;
    wherein said computing unit further comprises:
    a multiplexer for selecting said R data items from said input digital data and the transition-stage data from said second storage device;

a first data processing unit for receiving a first set of R/2 data items from said R data items, rotating said first set of R/2 data items with a first angle, and outputting a first set of rotated R/2 data items sequentially;

a second data processing and multiplexing unit for receiving said R data items and said first set of rotated R/2 data items, then either selecting said R data items within a first preset duration or selecting a second set of R/2 data items from said R data items for combining with said first set of rotated R/2 data items to form a new set of R data items within a second preset duration, rotating said R data items or said new set of R data items with a second angle, and outputting said R rotated data items sequentially; and an adder for adding said R rotated data items sequentially, and outputting a sum in frequency domain of said R rotated data items.

2. The Fast Fourier Transform computing device according to claim 1, wherein said R is an M-th power of 2, M being an integer greater than or equal to 3.

3. The Fast Fourier Transform computing device as claimed in claim 1, wherein said computing unit further comprises:

a multiplexer for selecting said R data items from said input digital data and the transition-stage data from said second storage device;

a first data processing unit for receiving a first set of R/2 data items from said R data items, rotating said first set of R/2 data items with a first angle, and outputting a first set of rotated R/2 data items sequentially;

a second data processing and multiplexing unit for receiving said R data items and said first set of rotated R/2 data items, then either selecting said R data items within a first preset duration or selecting a second set of R/2 data items from said R data items for combining with said first set of rotated R/2 data items to form a new set of R data items within a second preset duration, rotating said R data items or said new set of R data items with a second angle, and outputting said R rotated data items sequentially; and an adder for adding said R rotated data items sequentially, and outputting a sum in frequency domain of said R rotated data items.

4. The Fast Fourier Transform computing device according to claim 3, wherein said first angle is $2\pi/R$.

5. The Fast Fourier Transform computing device according to claim 3, wherein said first angle is a fixed angle.

6. The Fast Fourier Transform computing device according to claim 3, wherein said second angle is $2\pi/(R/2)$.

7. The Fast Fourier Transform computing device according to claim 6, wherein said second angle is a multiple of $2\pi/(R/2)$.

8. The Fast Fourier Transform computing device according to claim 3, wherein said first preset duration is earlier than said second preset duration.

9. The Fast Fourier Transform computing device according to claim 3, wherein said first set of R/2 data items has a sequence order as $1, 3, 5, 7, \ldots, R-1$.

10. The Fast Fourier Transform computing device as claimed in claim 3, further comprising:

an array of R registers for receiving said R data items from said multiplexer, outputting said R data items within said first preset duration, and outputting said second set of R/2 data items within said second preset duration; and an array of R/2 registers for receiving said first set of rotated R/2 data items from said first data processing unit, and outputting said first set of R/2 data items within second preset duration.

11. The Fast Fourier Transform computing device according to claim 1, wherein said R equals 8.

* * * * *